(12) United States Patent
Lee et al.

(10) Patent No.: US 11,449,294 B2
(45) Date of Patent: Sep. 20, 2022

(54) DISPLAY SYSTEM IN A VEHICLE

(71) Applicant: Continental Automotive GmbH, Hannover (DE)

(72) Inventors: Chee Wei Lee, Singapore (SG); Fook Wai Lee, Singapore (SG)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/652,265

(22) PCT Filed: Oct. 3, 2018

(86) PCT No.: PCT/EP2018/076898
§ 371 (c)(1),
(2) Date: Mar. 30, 2020

(87) PCT Pub. No.: WO2019/068754
PCT Pub. Date: Apr. 11, 2019

(65) Prior Publication Data
US 2020/0241824 A1    Jul. 30, 2020

(30) Foreign Application Priority Data
Oct. 4, 2017  (GB) ...................................... 1716146

(51) Int. Cl.
*G06F 3/14* (2006.01)
*B60K 35/00* (2006.01)
(Continued)

(52) U.S. Cl.
CPC ............ *G06F 3/1423* (2013.01); *B60K 35/00* (2013.01); *G06F 3/013* (2013.01); *G06F 3/017* (2013.01);
(Continued)

(58) Field of Classification Search
CPC ......... G10L 15/22; G06F 3/017; G06F 3/167; G06F 3/1423; G06F 3/013; G06F 3/165;
(Continued)

(56) References Cited

U.S. PATENT DOCUMENTS 8,687,840 B2    4/2014  Singhar
9,043,042 B2    5/2015  Kalhous et al.
(Continued)

FOREIGN PATENT DOCUMENTS

DE    102011112717 A1    3/2013
GB       2535544 A       8/2016
(Continued)

OTHER PUBLICATIONS

International Search Report and Written Opinion for International Application No. PCT/EP2018/076898, dated Jan. 23, 2019, 10 pages.

*Primary Examiner* — Christopher E Leiby
(74) *Attorney, Agent, or Firm* — RatnerPrestia (57) ABSTRACT

A display system in a vehicle, including: one or more displays; at least one sensor determining a user's line of sight; a controller determining an active zone and a non-active zone of the one or more displays based on the user's line of sight. The one or more displays are configured to operate the active zone at an enhanced level as compared to the non-active zone. There is further provided a controller configured to rank content displayed on one or more displays in a vehicle according to an attention score determined by at least one sensor configured to measure gaze of a user based on the user's line of sight; and a display system including the controller. One of the displays is selected to display the highest ranked content. There is also provided a method of operating one or more displays in a vehicle using the disclosed display systems.

28 Claims, 4 Drawing Sheets

(51) Int. Cl.
  *G06F 3/01* (2006.01)
  *G06F 3/16* (2006.01)
  *G10L 15/22* (2006.01)

(52) U.S. Cl.
  CPC .............. *G06F 3/165* (2013.01); *G06F 3/167* (2013.01); *G10L 15/22* (2013.01); *B60K 2370/146* (2019.05); *B60K 2370/148* (2019.05); *B60K 2370/149* (2019.05); *B60K 2370/1529* (2019.05); *B60K 2370/166* (2019.05); *B60K 2370/172* (2019.05); *B60K 2370/21* (2019.05); *B60K 2370/349* (2019.05); *G10L 2015/223* (2013.01)

(58) Field of Classification Search
  CPC .. B60K 35/00; B60K 37/06; B60K 2370/152; B60K 2370/182; B60K 2370/149; B60K 2370/186; B60K 2370/21; B60K 2370/172; B60K 2370/1529; B60K 2370/349; B60K 2370/148; B60K 2370/191; B60K 2370/166; B60K 2370/146
  See application file for complete search history.

(56) References Cited

U.S. PATENT DOCUMENTS

| | | | |
|---|---|---|---|
| 9,261,958 B2 | 2/2016 | Yoo et al. | |
| 9,459,691 B2 | 10/2016 | Chen et al. | |
| 9,491,417 B2 | 11/2016 | Giesler et al. | |
| 9,530,410 B1* | 12/2016 | LeBeau | G10L 15/22 |
| 9,804,669 B2* | 10/2017 | Fateh | G02B 27/646 |
| 10,019,069 B2* | 7/2018 | Naruse | G06F 3/013 |
| 10,502,962 B2* | 12/2019 | Fujita | G09G 5/36 |
| 11,238,340 B1* | 2/2022 | Anderson | G06F 17/18 |
| 2011/0310001 A1 | 12/2011 | Madau et al. | |
| 2012/0300061 A1 | 11/2012 | Osman | |
| 2015/0254945 A1* | 9/2015 | Kim | B60K 37/06 340/462 |
| 2016/0054967 A1 | 2/2016 | Gonzalez et al. | |
| 2016/0109961 A1* | 4/2016 | Parshionikar | G06F 3/013 345/156 |
| 2017/0090566 A1 | 3/2017 | George-Svahn et al. | |
| 2017/0212583 A1* | 7/2017 | Krasadakis | G06F 3/0482 |
| 2018/0032300 A1 | 2/2018 | Singh et al. | |
| 2018/0114672 A1* | 4/2018 | Ogawa | H01J 37/05 |
| 2018/0144672 A1* | 5/2018 | Fujita | G09G 3/001 |
| 2018/0146198 A1* | 5/2018 | Atluru | G06V 20/41 |
| 2018/0239424 A1 | 8/2018 | Nishihashi et al. | |
| 2018/0286105 A1* | 10/2018 | Surti | G06T 15/005 |
| 2022/0005259 A1* | 1/2022 | Surti | G06T 15/10 |

FOREIGN PATENT DOCUMENTS

| | | |
|---|---|---|
| JP | 2017039440 A | 2/2017 |
| JP | 2017187955 A | 10/2017 |
| WO | 2016152044 A1 | 9/2016 |

\* cited by examiner

Fig. 3B odometer    Fig. 3C odometer    Fig. 3D

Fig. 4

DISPLAY SYSTEM IN A VEHICLE

CROSS REFERENCE TO RELATED APPLICATIONS

This application is the U.S. National Phase Application of PCT International Application No. PCT/EP2018/076898, filed Oct. 3, 2018, which claims priority to Great Britain Patent Application No. 1716146.4, filed Oct. 4, 2017, the contents of such applications being incorporated by reference herein.

FIELD OF INVENTION

This invention relates to display systems adapted for vehicles.

BACKGROUND OF INVENTION

To enhance driving experience, the number and size of displays in the vehicle and the information provided on these displays are ever increasing. However, this trend could lead to increased driver distraction and result in safety concerns, particularly when more displays and information are within the driver's line of sight while the driver is operating the vehicle. The various operating displays may also cause driver fatigue. Driver fatigue may also be caused by having to adapt to different lighting conditions of the various displays or between ambient lighting and interior cabin lighting.

Further, as a result of the increased amount of information to be displayed, each piece of information may need to be reduced in size to fit within the displays. Drivers may thus require a longer time to read and identify the information required from each display among all the information provided on all of the displays. This also contributes to increased driver distraction.

There is therefore a need to provide vehicle displays that overcome or at least ameliorate one or more of the disadvantages discussed above.

SUMMARY OF THE INVENTION

An aspect of the invention is a display system in a vehicle to address the problems discussed above. Particularly, an aspect of this invention is a display system in a vehicle that provides reduced driver distraction. A further aspect of this invention is a display system in a vehicle which displays information desired by the driver or a passenger and in a manner that is efficiently received by the driver or the passenger.

To accomplish this, there is provided, in a first aspect, a display system in a vehicle, the system comprising: one or more displays; at least one sensor configured to determine a user's line of sight; a controller configured to determine an active zone and a non-active zone of the one or more displays based on the user's line of sight, wherein the one or more displays are configured to operate the active zone at an enhanced level as compared to the non-active zone.

A display in a vehicle may include any physical screen used to electronically display the output of a computer or processor. The display may optionally provide an interface for interaction with the driver or user. Thus, the display may provide information to and receive information from the driver or user. Typical displays found in a vehicle include instrument clusters, head up displays, any secondary display such as those in the centre stack, and any other displays for vehicles such as digital rear view mirror, digital side view mirror, windshield, sun visor, and faceplate. The display may be configured to display a single-screen display or a multi-screen display. That is, in a multi-screen display, the single physical screen can include multiple displays that are managed as separate logical displays. Thus, different content can be displayed on a multi-screen display although they are part of the same physical screen. Accordingly, each display or physical display of the vehicle may comprise one logical display or multiple logical displays.

Content may include those typically displayed in vehicles, such as gauge readings, speedometer readings, fuel level, engine or gear settings such as vehicle driving mode, sports mode, economy mode, manual gear transmission mode, automatic gear transmission mode, electronic maps, navigation instructions, direction of travel, route destination, time of arrival, traffic information, speed limits, time, weather, climate control settings, radio settings, details of media content, videos, button selection symbols, and content synced from other devices such as calendar events, instant messages, emails, notifications, social media content, and calls. As may be appreciated, content may be pulled from sources external to the disclosed display system, e.g. navigation instructions may be pulled from a navigation unit or calendar events may be pulled from connected devices.

A vehicle finding utility with the present disclosure is not particularly limited as long as the vehicle comprises one or more displays. Exemplary vehicles include cars, trucks, vans, boats, and planes.

The disclosed system comprises one or more sensors configured to determine a user's line of sight. The sensor assists to track where the user is looking at or focusing on. The sensor may further assist to distinguish facial gestures or expressions, such as squinting of eyes, frowning, raised eyebrow(s), or other gestures as disclosed herein. Sensors suitable for the present purpose include those that track movement of the user's eyes or head or body, such as interior camera, head movement sensor or body movement sensor.

Interior cameras or optical sensors gather raw optical data, using for example colour CMOS sensor, time of flight sensor, etc., to track the user's eyes. The tracking and prediction of user's line of sight, also known as eye-gaze detection, are done with known methods such as pattern recognition, corneal reflection points, dark and bright pupil effect or combinations thereof. Where the user's eyes are partially or fully obscured, the head or body movement sensor can assist to determine the direction of user's view and estimate the line of sight. Head movement sensors are capable of sensing the head's lateral movements and rotation movements (e.g. roll, yaw and pitch). Body movement sensors are capable of sensing movement of a subject's body in a plurality of directions. Therefore, such head or body movement sensors are capable of detecting gestures from the user. In some instances, such optical sensors or head or body movement sensors may be individual devices on its own. In other instances, the sensors may be integrated as one device; for example, the head or body movement sensors may be embedded or integrated into the interior camera.

The sensor(s) may constantly monitor user's eyes, head and/or body movement and predict the user's line of sight. The user's line of sight is therefore used to determine which display or displays and/or which content is required or desired by the user. The display(s) and/or content are then grouped into areas by the controller. That is, the controller takes in input from the sensor(s) and maps the input into areas or zones within the group of displays and/or within a single display. The area in which the user is gazing at or focusing on is termed the "active zone". Consequently, all other display areas will be considered the "non-active zone".

The present disclosure provides assistance in enhancing the area of interest to make it easier for the driver or user to identify and/or read information in this area of interest. Accordingly, the time required by the driver for such task may be reduced and the driver may return attention to the main task of operating the vehicle, thereby reducing driver distraction. Advantageously, operation of the display(s) in the vehicle may become natural to the driver, instead of being a distraction to the driver. The instantaneous and temporary operation of the active and non-active zones also allow the system to provide a variable power mode, thereby extending the lifetime of the system.

The term "user", as used throughout the present disclosure, refers to any operators of the display system, including the driver as well as any occupants or passengers of the vehicle.

Hence, terms such as "a", "an" and "the" are not intended to refer to only a singular entity, such as a single user, but include the general class of which a specific example may be used for illustration.

The display system may be configured appropriately according to design intent in the event that multiple users are using the display system at the same time. The display system may be configured to allow multiple users to use the system at the same time. For example, when more than one user's line of sight is detected on one display, each line of sight determines one active zone which can be operated as disclosed herein. Say when a driver is looking at a gauge reading displayed on an integrated infotainment and instrument cluster single display, and a front passenger is looking at media content displayed on the same integrated display, the gauge reading and the media content each become an active zone. Alternatively, the display system may be configured to allow certain displays to be used only by certain users. For example, the instrument cluster, head up display, and side and rear view mirror displays may be predefined for use only by a user in the driver's seat, while the video display may be predefined for use only by a user in the passengers' seats. In another example, only certain displays in the vehicle may be configured as part of the disclosed display system.

Operation of the active and non-active zones may comprise modification of an operating parameter of the one or more displays selected from the group consisting of: illumination; movement of any object on the display; magnification; and combinations thereof. The active and non-active zones may be operated to permit driver attention on the traffic ahead. Prior art displays may be distracting especially when the displays all have high brightness, high colour contrast, constantly changing content, or may otherwise be sensitive to the eyes. Advantageously, the present disclosure provides that only when certain information or content is required by the user will the active zone containing such content increase display readability and/or enhance information presentation.

Modification of the operating parameter of the display(s) may be executed by a controller of the display. That is, the controller of the display system may transmit a telegram message via a bus network or other appropriate network to an appropriate controller of the relevant display, e.g. the graphics processor or the LED driver, to execute the modification of the operating parameter, e.g. adjust brightness, gamma values, grey-scale values, zooming in, zooming out, or other parameters as disclosed herein.

In an example, the active zone may be operated at full illumination, e.g. at full colour and/or brightness. Where prior art vehicle displays may all be operated at the same colour and/or brightness, the disclosed system may only operate the active zone at full colour and/or brightness. The distraction from lesser important display(s) and/or content in the non-active zone at any point in time may be reduced or removed. Furthermore, in this example, power may be saved as only a subset of the displays, i.e. the active zone, is operated at enhanced illumination. Consequently, thermal dissipation due to power dissipation may be reduced.

Conversely, the non-active zone may be operated at lower illumination, e.g. lower brightness, lower contrast, and/or lower grey-scale value, as compared to the active zone. That is, where prior art vehicle displays may all be operated at the same colour and/or brightness, the disclosed system may dim or darken or grey off the non-active zone, while maintaining higher brightness, higher contrast, and/or coloured graphics in the active zone. The disclosed system may even switch off the non-active zone, while maintaining the brightness, contrast and/or coloured graphics in the active zone. For example, the brightness of the active zone may be at least 2, 3, 4 or 5 times that of the non-active zone. In day time, brightness of the active zone may be 600 cd/m$^2$, while brightness of the non-active zone may be 100 cd/m$^2$; at night, brightness of the active zone may be 100 cd/m$^2$, while brightness of the non-active zone may be 10 cd/m$^2$. Similarly, the grey-scale value of the active zone may be at least 2, 3, 4 or 5 times that of the non-active zone. In day time, ratio of the grey-scale value of the active zone to the non-active zone may be 6:1; at night, ratio of the grey-scale value of the active zone to the non-active zone may be 10:1.

Lowering the brightness of the non-active zone may be done in any suitable way, e.g. by decreasing the backlight brightness of the display(s) in the non-active zone. Lowering the contrast may be done in any suitable way, e.g. by adjusting the gamma value to tune both the dark and bright areas in all three primary colours to be darker, while increasing the contrast in the active zone may mean that the gamma value is adjusted so that the details in the dark areas or shadows are clearer. Greying off the non-active zone may be done in any suitable way, e.g. where the highest grey-scale values make an image appear white, the grey-scale value in the non-active zone may be decreased to grey or darken out the non-active zone.

Thus, the operating parameter(s) of the active zone may be modified such that the display(s) in the active zone have higher perceived brightness and/or contrast to the user as compared to the non-active zone. While prior art displays may only be capable of adjusting brightness across all displays, the disclosed system is advantageously capable of adjusting individual illumination parameters for each display. Despite the ability to customize each display of the disclosed system, the system as a whole remains easy to use.

In another example, movement of any object on the display may be suspended in the non-active zone. Examples of moving or dynamic objects on a display include speedometer readings, navigation guidance, scrolling of media details such as song title, song album and artist, and videos. Any moving or dynamic object may be frozen when such information is not required, i.e. in the non-active zone. When the user desires once again to view the dynamic object, the sensor(s) will detect the user's line of sight and the display displaying the suspended object will become the active zone. Thus, the suspended object may once again move as designed to show, e.g., the continuously updated speed, the current song, etc. Advantageously, driver distraction from movement on display(s) which are not required at the time may be reduced as the changing graphics can be a source of distraction.

The manufacturer may include overrides or exceptions into the controller to cater for situations when driver or user attention to the particular content or display is needed. Exemplary overrides include critical warnings, alerts for driver to take over a semi or fully autonomous driving mode, and maintaining full operation of the digital side view mirror when other vehicles are close by. Under such overrides, the corresponding display will not be affected by the zoning and subsequent operation of the active and non-active zones but will maintain full operation, e.g. brightness, contrast and display of dynamic objects.

As mentioned above, the disclosed system may comprise one display or multiple displays. Where the system comprises one display, the active zone and non-active zone are within the one display. Where the system comprises more than one display, the active zone may comprise one display or more than one display (but less than the total number of displays). For example, the driver may be looking generally at the centre stack which houses a navigation display between air-conditioning vents and a secondary display above the navigation display. Thus, the controller may determine the navigation display and the secondary display to be the active zone, while other displays such as the head-up display and the instrument cluster may be determined as the non-active zone. Therefore in this example, the active zone may comprise more than one display (termed herein as a global active zone). If the driver focusses further on a part of the navigation display, e.g. a destination point, the active zone is now determined to be that part of the navigation display, while other parts of the map in the navigation display are determined as the non-active zone. In this example, the other parts of the map may be darkened out, while the destination point may be retained in colour and may further be magnified or enlarged for easy viewing. Thus in this example, the active and non-active zones are within the one display (termed herein as a local active zone).

Accordingly, where the active zone is within one display, the active zone may be magnified. The disclosed sensor(s) in the system are advantageously capable of identifying and differentiating a local active zone from within a global active zone. Particular information that the user wishes to see in a local active zone may therefore be suitably enhanced or magnified or zoomed in for quicker identification by the user. When the user stops looking at the local active zone, i.e. the line of sight is discontinued, the magnified local active zone will then shrink back to its normal size. In some instances, magnification of the active zone may be activated upon a command from the user, thereby allowing the user to retain control of the presentation of information on the display.

The shape and size of the active zone, whether a local or global active zone, are not particularly limited and may be adjustable as determined by display intention or design intention. For example, a global active zone may include one full display; one full display and half of a second display; two full displays, etc. In another example, a local active zone within a navigation display may include a particular point of interest as well as its surrounding neighbourhood. Alternatively, a local active zone within a media display may include just the song title or just the time progress bar. The separation between the active and non-active zones may or may not be a fixed separation line and may be adjustable as determined by display intention or design intention. The enlarged graphics of the active zone may overlay onto part of the non-active zone. Furthermore, the granularity of a zone may be adjustable as determined by display intention or design intention. For example, a magnified local active zone of a navigation display may have higher granularity, i.e. finer images, than a magnified local active zone of a media display. Generally, the zones are defined so as to provide comfortable usage to the user.

The display(s) may be connected to an audio output, such as a speaker, to allow objects on the display to be accompanied by sound. For example, navigation instructions may be accompanied by audio instructions so that the driver can see as well as hear the turn-by-turn instructions. Where the one or more displays are connected to an audio output, and where an object displayed in the active zone is accompanied by audio, operation of the active zone may comprise at least one of: an increased volume of the audio output, or a repeat of the audio output. A combination may involve repeating the audio output by paraphrasing the instruction at an increased volume to advantageously achieve greater clarity of instruction. The line of sight data may determine such operation of the audio output. For example, upon hearing navigation instructions that the driver is unclear of, the driver may look at the navigation display which becomes the active zone and the audio output may be modified accordingly. Alternatively or additionally, operation of the audio output may be activated upon a command from the user.

The line of sight data may determine the active and non-active zones and the system may automatically operate the active zone at an enhanced level as compared to the non-active zone. Alternatively or additionally, operation of the active and non-active zones may be activated upon a command from the user, such as magnification of the active zone or operation of the audio output of the active zone. Thus, the user may retain at least some control of the operation of the zones.

In instances where operation of the active zone is activated upon a command, the disclosed system may further comprise an input means to receive the command from the user. The command received by the input means may be transmitted to the disclosed controller and subsequently to an appropriate controller to execute the command. The input means may comprise an audio sensor such as a microphone to receive a voice command from the user. Such audio sensor gathers acoustic feedback from the user and/or the surrounding and provides the feedback to the controller. The input means may comprise a selection command or haptic input on one of the displays for selection by the user. The input means may comprise a movement sensor, such as the interior camera, head movement sensor and/or body movement sensor disclosed herein, to receive a gesture command from the user. Alternatively, the input means may be a combination of the mentioned input means. Thus, in this implementation, if the input means detects an affirmative response from the user, the system proceeds to operate the active zone appropriately.

For example, a gesture of the driver's head moving forward in the driving direction may be programmed as a command to activate the magnification of the active zone. In this example, the interior camera and/or the head movement sensor may determine the driver's line of sight and the controller may determine a global active zone based on the line of sight data, resulting in diminishing the operation of, e.g. darkening out, the display(s) in the non-active zone. Thereafter, the head movement sensor may detect the gesture of the driver's head moving forward, while maintaining line of sight on the content, and the controller may determine a local active zone based on the gesture command, resulting in the enlargement of graphics in the local active zone. The local non-active zone may remain in colour, i.e. not darkened out; however the magnification of the local non-active zone may remain unchanged. Operation of the global non-active zone and the local non-active zone may be programmed as per display or design intent. Alternatively, a spoken command, such as "zoom in", may be programmed as a voice command to activate the magnification of the active zone, while maintaining line of sight on the content. Yet another alternative would be to utilize a display to display the question "zoom in?" and selection buttons "yes" and "no" to activate the magnification of the active zone.

In another example, a gesture of the driver demonstrating confusion, e.g. eye rolling, head tilting, and/or frowning, may be programmed as a command to repeat an audio turn-by-turn route instruction of a navigation display in the active zone. In this example, the interior camera may determine the driver's line of sight on the navigation display, resulting in diminishing the operation of all other displays which are in the non-active zone. Thereafter, the head movement sensor and/or the interior camera may detect the facial gesture from the driver and the controller may activate a repeat of the route instruction through the audio output.

In some instances, the system may automatically operate the active zone at an enhanced level as compared to the non-active zone based on the line of sight data and the driver may provide a command to further tune the operation of the active zone according to his preference.

The commands, e.g. gesture command, voice command and/or selection command, may be predetermined by the manufacturer and pre-programmed into the disclosed display system. Alternatively or additionally, the disclosed display system may detect or learn common gestures and/or words from the user and update the collection of commands in the program of the display system. The system may thus advantageously be scalable so that the user can build further commands into the system according to gestures and/or words he is familiar with.

Thus, the disclosed display system may further comprise an artificial intelligence (AI) software connected to the controller so that the system may learn from data obtained from the at least one sensor and/or the input means and refine the operation or display output of the active and non-active zones. Advantageously, the AI software may provide machine learning capabilities to the disclosed system to improve robustness of the decisions made by the system. The AI software may utilize information from the cloud or a database to infer how other users operate the system. For example, users with similar demographics may be concerned with certain content more than other content. Thus, the AI software may tap on this knowledge to improve the system. Additionally, positive or negative reinforcements from gesture and/or voice commands from the user may be detected and used by the AI software. For example, the driver or user saying "oh yes" or nodding his head may be programmed to be interpreted as a positive reinforcement of the controller, e.g., magnifying a certain part of the display deemed to be the active zone. Thus, when similar line of sight or other data are detected by the disclosed system in the future, the controller will issue the same command to magnify the same part of the display. Conversely, the driver or user saying "no no no" or shaking his head may be programmed to be interpreted as a negative reinforcement so that the display output may be reassessed, the appropriate operating parameter modified and the operation of the active and non-active zones refined. Thus, the user's intent of which display(s) should be selected as the active zone based on the line of sight sensor data and the user's intent of which operating parameter(s) of the active and non-active zones should be modified and how they should be modified may be continuously refined by the AI software. The AI software may therefore be configured to compare display output with user intent.

The controller may be programmed to prioritize display intent or design intent in order to maintain driving safety and to minimize confusion.

The controller disclosed above may be further configured to rank content displayed on each display according to an attention score determined by a gaze measurement of the user based on the user's line of sight. As mentioned above, the disclosed sensor(s) assist to track where the driver or user is looking at or focusing on, i.e., the user's gaze. Each time the driver or user looks at a content, the attention score of that content increases. The attention score may be determined by the number of gazes on a particular content, duration of each gaze on that particular content, or a combination thereof. The exact calculation of the attention score may be determined according to design intent. The highest ranked content represents the content that the user is most concerned about. In some instances, the highest ranked content may be copied to or moved to, e.g., a display in the active zone or a preselected display such as the head up display, so that the user may have easy access to the most desired information in the most visible display preferred by the user. Alternatively, the display selected to display the highest ranked content may be selected by the manufacturer or the user, e.g. the driver. In some instances, the controller may decide if it is necessary to display the highest ranked content on the additional display. For example, the controller may decide that the highest ranked content may be presented in other ways for easy access by the user, e.g. by magnifying the highest ranked content. In another example, the controller may decide if it is not appropriate to display the highest ranked content on an additional display, e.g. if the highest ranked content is a video. Advantageously, the disclosed display system displays information desired by the user in a manner that is efficiently received by the user. Further advantageously, driver distraction may be reduced and the driver may maintain focus on operating the vehicle while referring to the desired information displayed on a convenient display. Even further advantageously, content may be conveniently and dynamically provided to the user based on his needs.

In some instances, the ranking of content may be undertaken for a period of time and the highest ranked content at the end of that time may be displayed in a selected display or otherwise presented for easy access by the user.

In some instances, the display of the highest ranked content on a selected display or otherwise presented for easy access by the user may be activated upon a command from the user, thereby allowing the user to retain control of the presentation of information on the display. The command may be one as disclosed herein. In instances where the system further comprises an AI software, if a command is repeated frequently enough, the controller may automatically display the highest ranked content on the display previously selected.

The ranking of the content may be reset upon a command from the user or after a period of time. The user may determine via a command or otherwise whether the highest ranked content should continue being copied to the active zone or the preselected display.

In some instances, the controller may be configured to determine whether the user's gaze or user's line of sight is genuine before the active and non-active zones are determined and before counting of the attention score is started. Genuineness of gaze may be determined by any suitable means. For example, once a threshold timing of, e.g., 0.1 seconds has passed, the controller may then proceed to determine the active and non-active zones and/or start counting the attention score of content. Gazes below the threshold timing may not be considered by the controller and may be considered a false trigger, thus no changes to the display(s) will occur.

There is therefore provided, in a second aspect, a controller configured to rank content displayed on one or more displays in a vehicle according to an attention score determined by at least one sensor configured to measure gaze of a user based on the user's line of sight.

As mentioned above, the attention score may be determined by at least one of: number of gazes on a content or duration of each gaze on the content. The content ranked may be one as disclosed herein. In some instances, the content ranked is selected from the group consisting of: driving mode, calendar event, route destination, traffic information, weather, time, and a combination thereof.

The display system may only include the controller of the second aspect. That is, in a third aspect, there is provided a display system in a vehicle, the system comprising: one or more displays; at least one sensor configured to determine a user's line of sight; the controller of the second aspect, wherein one of the displays is selected to display the highest ranked content. As mentioned above, since the highest ranked content represents the content that the user is most concerned about, it is advantageous that the highest ranked content is presented in a manner that is easily accessible by the user. The manner of presentation of the highest ranked content may be one as disclosed herein. For example, the highest ranked content may be copied to or moved to a display desired by the user, for example the display most visible to the driver.

There is provided, in a fourth aspect, a method of operating one or more displays in a vehicle using the system of the third aspect, the method comprising: determining, by the at least one sensor, a user's line of sight; determining, by the controller, a ranking of content displayed on each display according to an attention score determined by gaze of the user based on the user's line of sight; selecting one of the displays to display the highest ranked content; displaying the highest ranked content on the selected display.

In some instances, selection of the display to display the highest ranked content may be undertaken by the manufacturer or the user via any suitable input means, such as those disclosed herein. In some instances, selection of the display to display the highest ranked content may be undertaken by the controller. In such instances, the controller may be configured to determine which display is most suitable for display of the highest ranked content, for example the display most visible to the driver or user or a display in an active zone. Accordingly, the controller may be one as disclosed herein.

The display(s) and the sensor(s) may be selected from those disclosed herein. The ranking of content and the attention score may be determined in a manner as disclosed herein.

There is provided, in a fifth aspect, a method of operating one or more displays in a vehicle using the system of the first aspect, the method comprising: determining, by at least one sensor, a user's line of sight; determining, by a controller, an active zone and a non-active zone of the one or more displays based on the user's line of sight; operating the active zone of the one or more displays at an enhanced level as compared to the non-active zone.

The display(s) and the sensor(s) may be selected from those disclosed herein.

The step of operating the active zone at an enhanced level as compared to the non-active zone may be undertaken in a manner as disclosed herein. For example, operating the active and non-active zones may comprise modifying an operating parameter of the one or more displays selected from the group consisting of: illumination; movement of any object on the display; magnification; and combinations thereof. In a specific example, operating the active and non-active zones may comprise at least one of: decreasing brightness of the non-active zone as compared to the active zone; decreasing contrast of the non-active zone as compared to the active zone; decreasing a grey-scale value of the non-active zone as compared to the active zone; or suspending movement of any object on the display of the non-active zone. In another example, where the active zone is within one display, operating the active zone may comprise magnifying the active zone. In yet another example, where an object displayed in the active zone is accompanied by audio, operating the active zone may comprise at least one of: increasing the volume of the audio output; or repeating the audio output.

As mentioned herein, the step of operating the active and non-active zones may be activated upon a command from the user. Thus, the method may further comprise receiving, by an input means, a command from the user. The input means may be one as disclosed herein, for example an audio sensor to receive a voice command from the user, a selection command on a display, a movement sensor to receive a gesture command from the user, or combinations thereof.

An example of an operating parameter that may be activated upon a command from the user includes the audio output, e.g. sound from a speaker. In this example, when a command from the user is received, the steps of increasing the volume of the audio output of the active zone and/or repeating the audio output of the active zone are activated.

The disclosed methods may further comprise using data obtained from the at least one sensor and/or the input means in an artificial intelligence software to compare display output with user intent. Examples of data obtained from the sensor(s) and/or the input means to refine the operation or display output of the display(s) and/or the active and non-active zones are as disclosed herein.

The description of aspects of this invention is provided for the purpose of explaining the principles of aspects of the invention and its practical application, thereby enabling person skilled in the art to understand aspects of the invention for various exemplary embodiments and with various modifications as are suited to the particular use contemplated. The detailed description is not intended to be exhaustive or to limit aspects of the invention to the precise embodiments disclosed. Modifications and equivalents will be apparent to practitioners skilled in this art and are encompassed within the spirit and scope of the appended claims.

For example, the disclosed display system may be used in a virtual reality headset, gaming console, mobile device, multiple screen setup or home assistant, or may be used in theatre.

BRIEF DESCRIPTION OF DRAWINGS

In the figures, like numerals denote like parts.

DETAILED DESCRIPTION OF THE PREFERRED EMBODIMENTS

Hereinafter, exemplary embodiments of the present invention will be described in detail with reference to the accompanying drawings.

Figure 1:
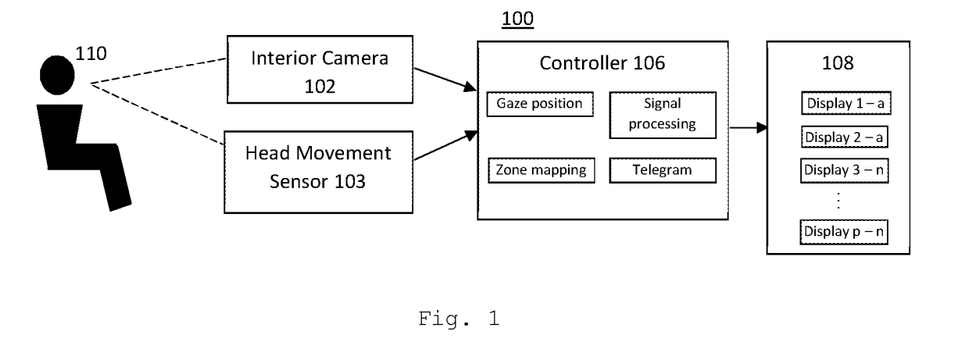
FIG. 1 shows an illustration of the architecture of a display system 100 according to a first embodiment of this invention.

FIG. 1 shows an illustration of the architecture of a display system 100 according to a first embodiment of this invention. The display system 100 comprises p displays 108; an interior camera 102 and a head movement sensor 103, both configured to determine a driver's line of sight; a controller 106 configured to determine an active zone and a non-active zone of the p displays 108 based on the driver's line of sight, wherein the p displays 108 are configured to operate the active zone at an enhanced level as compared to the non-active zone.

The interior camera 102 constantly monitors the eye movement of driver 110 to predict the driver's line of sight. Where the interior camera 102 is unable to detect the eyes of driver 110 to accurately predict the driver's line of sight, the head movement sensor 103 monitors the head movement of driver 110 to determine the direction of view of the driver and predict the driver's line of sight. The driver's line of sight is used to determine which display or displays the driver 110 is gazing at. The gaze position of the driver 110 represents the display area that the driver 110 is most concerned about. The controller 106 maps the gaze position into areas or zones within the group of displays 108. The area in which the driver 110 is gazing at is termed the "active zone".

Here, displays 1 and 2 are determined as the active zone, denoted as "a", and displays 3 to p are determined as the non-active zone, denoted as "n". Thus, system 100 comprises more than one display, i.e. p displays, and the active zone comprises more than one display, i.e. display 1 and display 2.

Operation of the active zone at an enhanced level compared to the non-active zone may comprise modification of an operating parameter of the displays 108 selected from the group consisting of: illumination; movement of any object on the display; magnification; and combinations thereof. For example, illumination of displays 3 to p in the non-active zone may be modified to have at least one of lower brightness, lower contrast, and/or lower grey-scale value, as compared to displays 1 and 2 in the active zone. Another possible modification is to suspend the movement of any object on displays 3 to p in the non-active zone.

As to how the p displays 108 are operated, the method of operating p displays 108 in a vehicle using the system 100 comprises: determining, by interior camera 102 and head movement sensor 103, the line of sight of driver 110; determining, by controller 106, an active zone and a non-active zone of the p displays 108 based on the driver's line of sight; operating the active zone of the p displays 108 at an enhanced level as compared to the non-active zone.

As mentioned above, operating the active zone at an enhanced level compared to the non-active zone may comprise modifying an operating parameter of the one or more displays selected from the group consisting of: illumination; movement of any object on the display; magnification; and combinations thereof. For example, operating the active and non-active zones may comprise at least one of: decreasing brightness of the non-active zone as compared to the active zone; decreasing contrast of the non-active zone as compared to the active zone; decreasing a grey-scale value of the non-active zone as compared to the active zone; suspending movement of any object on the display of the non-active zone.

Say the modification in this case is to suspend the movement of any object on displays 3 to p and to grey off displays 3 to p. The controller 106 determines and processes the active and non-active zone signal, and transmits a telegram to the controller (not shown) of displays 108. When the telegram is received by the controller of displays 108, the controller of displays 108 identifies that displays 1 and 2 belong to the active zone and displays 3 to p belong to the non-active zone. The controller of displays 108 then proceeds to suspend the movement of any object in the non-active zone and decrease the grey-scale value of the non-active zone. As compared to the non-active zone, the active zone, i.e. displays 1 and 2, is adjusted or maintained with colour at higher brightness and higher contrast. Thus, displays 1 and 2 are operated at an enhanced level as compared to displays 3 to p because displays 1 and 2 have higher perceived brightness and contrast to the driver as compared to displays 3 to p.

Figure 2:
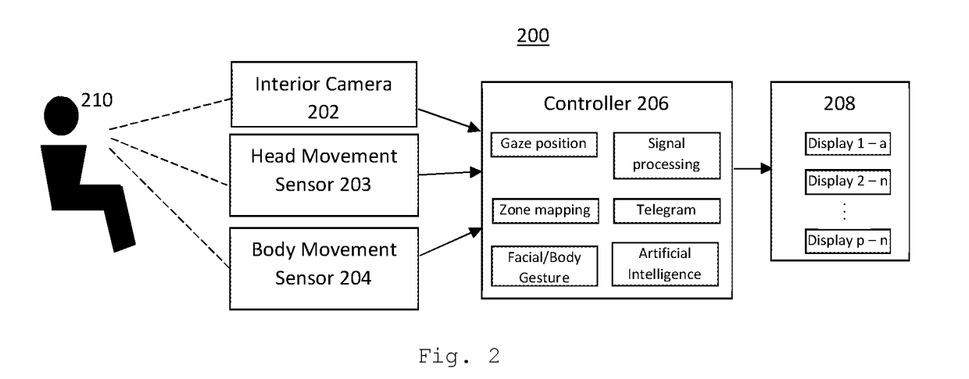
FIG. 2 shows an illustration of the architecture of a display system 200 according to a second embodiment of this invention.

FIG. 2 shows an illustration of the architecture of a display system 200 according to a second embodiment of this invention. The display system 200 comprises p displays 208; an interior camera 202, a head movement sensor 203 and a body movement sensor 204, all configured to determine a driver's line of sight; a controller 206 configured to determine an active zone and a non-active zone of the p displays 208 based on the driver's line of sight, wherein the p displays 208 are configured to operate the active zone at an enhanced level as compared to the non-active zone. The controller 206 further comprises an artificial intelligence software configured to use data obtained from interior camera 202, head movement sensor 203 and body movement sensor 204 to compare display output with driver intent.

The interior camera 202 constantly monitors the eye movement of driver 210 to predict the driver's line of sight. Where the interior camera 202 is unable to detect the eyes of driver 210 to accurately predict the driver's line of sight, the head movement sensor 203 and/or body movement sensor 204 monitors the head and body movement, respectively, of driver 210 to determine the direction of view of the driver and predict the driver's line of sight. The driver's line of sight is used to determine which display or displays the driver 210 is gazing at. The gaze position of the driver 210 represents the display area that the driver 210 is most concerned about. The controller 206 maps the gaze position into areas or zones within the group of displays 208. The area in which the driver 210 is gazing at is termed the "active zone".

Here, display 1 is determined as the active zone, denoted as "a", and displays 2 to p are determined as the non-active zone, denoted as "n". Thus, system 200 comprises more than one display, i.e. p displays, and the active zone comprises one display, i.e. display 1.

Operation of the active zone at an enhanced level compared to the non-active zone may comprise modification of an operating parameter of the displays 208 selected from the group consisting of: illumination; movement of any object on the display; magnification; and combinations thereof. For example, illumination of displays 2 to p in the non-active zone may be modified to have at least one of lower brightness, lower contrast, and/or lower grey-scale value, as compared to display 1 in the active zone.

Say the modification in this case is to dim displays 2 to p. After the controller 206 determines the gaze of driver 210 to be genuine, the controller 206 determines and processes the active and non-active zone signal, and transmits a telegram to the controller (not shown) of displays 208. When the telegram is received by the controller of displays 208, the controller of displays 208 identifies that display 1 belongs to the active zone and displays 2 to p belong to the non-active zone. The controller of displays 208 then proceeds to grey off the non-active zone. As compared to the non-active zone, the active zone, i.e. display 1, is adjusted or maintained at higher brightness and higher contrast. Thus, display 1 is operated at an enhanced level as compared to displays 2 to p because display 1 has higher perceived brightness and contrast to the driver as compared to displays 2 to p.

Figure 3A:
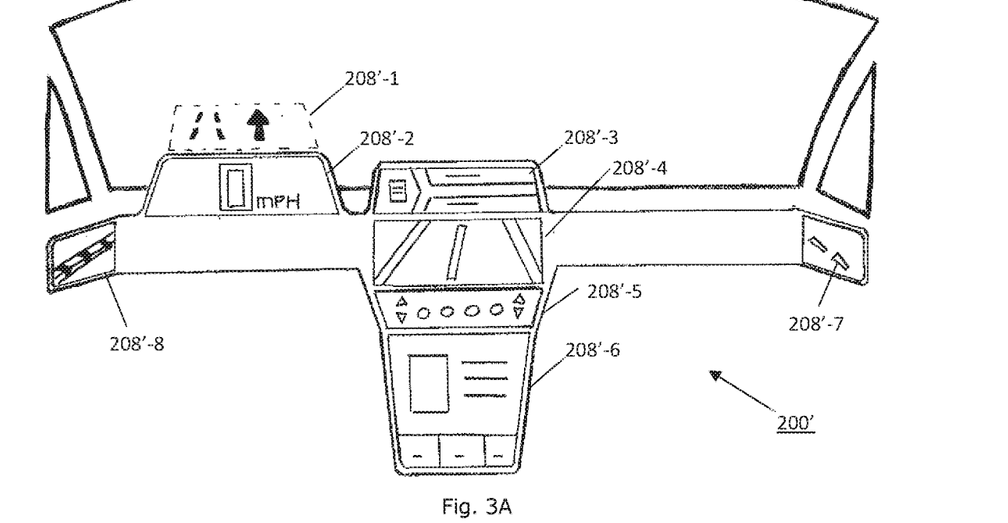
FIG. 3A shows an illustration of a prior art display system 200'.
Figure 3B:
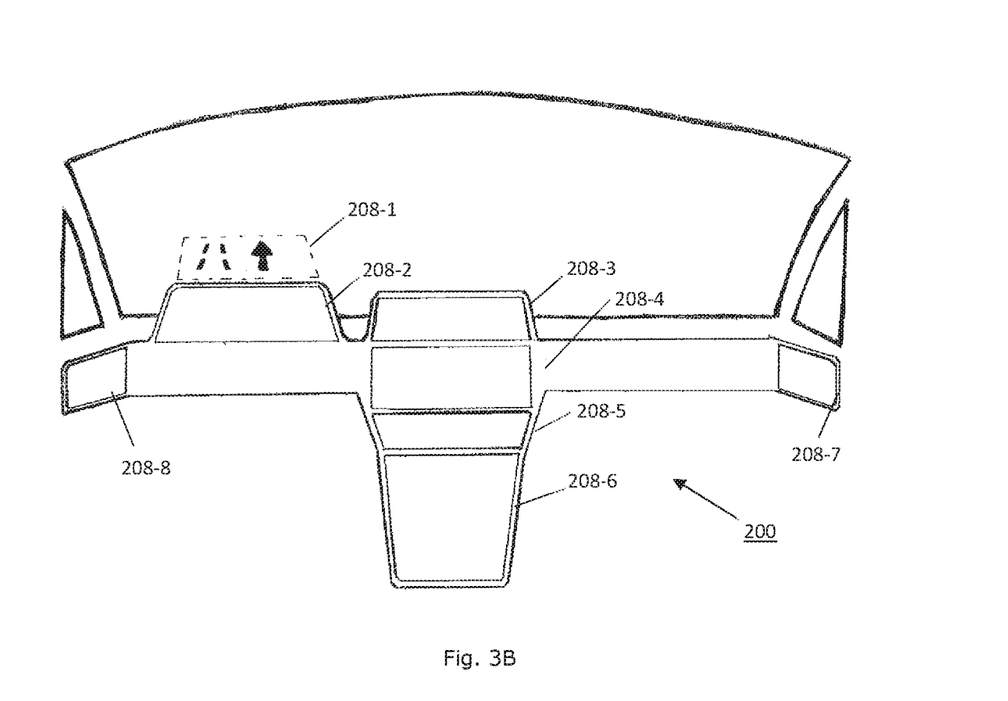
FIG. 3B shows an illustration of display system 200 according to the second embodiment of this invention, wherein display 208-1 belongs to the active zone and displays 208-2 to 208-8 belong to the non-active zone.

The above scenario is shown by way of illustration of a vehicle cockpit in FIG. 3A and FIG. 3B. Specifically, FIG. 3A shows a prior art display system 200' wherein all displays (208'-1 to 208'-7) are operated at the same level of operation, e.g. same brightness, same contrast and in full colour. On the other hand, FIG. 3B shows display system 200 according to the second embodiment of this invention wherein display 208-1 belongs to the active zone and is maintained at higher perceived brightness and contrast as compared to displays 208-2 to 208-8 which belong to the non-active zone and are greyed out.

In a next scenario, driver 210 chooses to gaze again on part of display 1 and at the same time moves toward display 1. The controller 206 determines and processes the active zone as that part of display 1 (the local active zone), while other parts of display 1 are grouped together with displays 2 to p and processed as the non-active zone. Thus, with respect to display 1, the active zone and non-active zone are within one display. At the same time, movement of driver 210 towards display 1 is detected by body movement sensor 204 and the movement is processed by controller 206 as a gesture command to activate magnification of the active zone. The controller 206 then transmits the telegrams to the controller of displays 208. When the telegram is received by the controller of displays 208, the controller of displays 208 identifies that the part of display 1 belongs to the active zone while the other parts of display 1 as well as displays 2 to p belong to the non-active zone. The controller of displays 208 then proceeds to magnify the local active zone, while keeping the local non-active zone and the global non-active zone unchanged (i.e. the other parts of display 1 are not magnified but still have higher brightness and higher contrast than displays 2 to p).

Figure 3C:
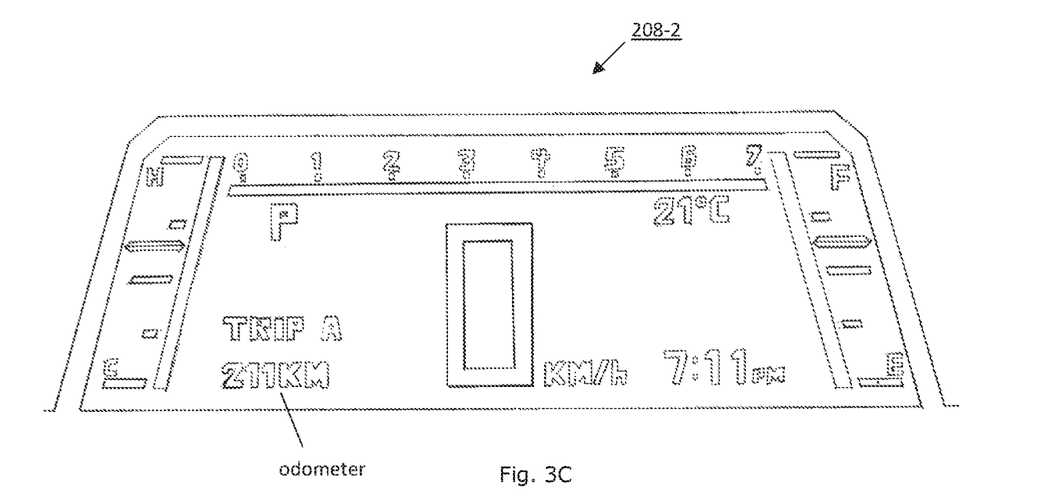
FIG. 3C shows an illustration of an instrument cluster display 208-2 according to the second embodiment of this invention.
Figure 3D:
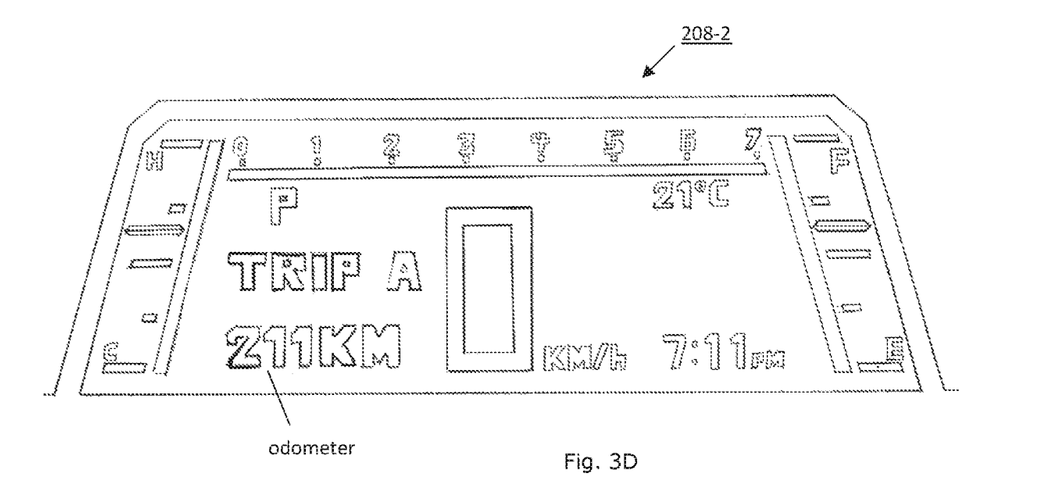
FIG. 3D shows an illustration of the instrument cluster display 208-2 according to the second embodiment of this invention, wherein the odometer in display 208-2 is magnified.

The above scenario is shown by way of illustration of an instrument cluster display 208-2 in FIG. 3C and FIG. 3D. Specifically, FIG. 3C shows that display 208-2 is the active zone and is therefore powered on. Driver 210 then gazes at the odometer in display 208-2 and at the same time moves toward display 208-2. This movement is interpreted as a gesture command to activate magnification of the active zone and the odometer is therefore magnified as shown in FIG. 3D.

In yet another scenario, driver 210 chooses to gaze yet again on the part of display 1 and frowns because he did not obtain the required information from the magnified local active zone. The frown is detected by interior camera 202 and processed by controller 206 as a facial gesture indicating a negative reinforcement. The artificial intelligence software compares the incorrectly magnified active zone with the line of sight sensor data or the gaze position and reassesses the zone to be magnified. The controller 206 then modifies the area to be magnified and transmits the telegram to the controller of displays 208. The controller of displays 208 then proceeds to magnify the updated area for the local active zone.

Figure 4:
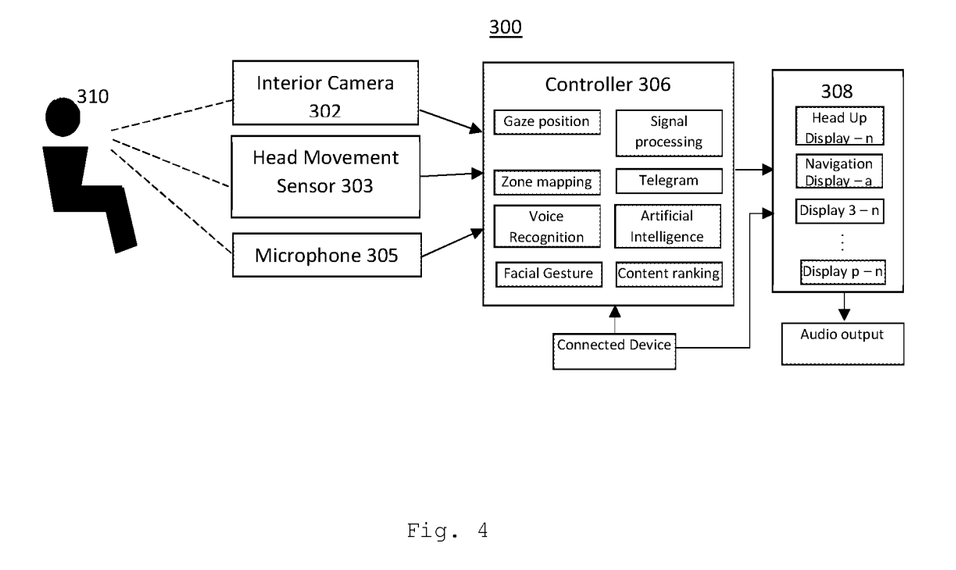
FIG. 4 shows an illustration of the architecture of a display system 300 according to a third embodiment of this invention.

FIG. 4 shows an illustration of the architecture of a display system 300 according to a third embodiment of this invention. The display system 300 comprises p displays 308 (including a navigation display and a head up display); an interior camera 302 and a head movement sensor 303, both configured to determine a driver's line of sight; a controller 306 configured to determine an active zone and a non-active zone of the p displays 308 based on the driver's line of sight, wherein the p displays 308 are configured to operate the active zone at an enhanced level as compared to the non-active zone. The p displays 308 are connected to an audio output to allow objects on the display to be accompanied by sound. The controller 306 is further configured to rank content displayed on the p displays 308 according to an attention score determined by the interior camera 302 and head movement sensor 303 which are configured to measure gaze of driver 310 based on the driver's line of sight. The controller 306 further comprises an artificial intelligence software configured to use data obtained from interior camera 302, head movement sensor 303 as well as microphone 305 to compare display output with driver intent.

Here, the navigation display is determined as the active zone, denoted as "a", and the head up display and displays 3 to p are determined as the non-active zone, denoted as "n". Thus, system 300 comprises more than one display, i.e. p displays, and the active zone comprises one display, i.e. the navigation display.

Say driver 310 is driving to a destination entered into the navigation display and the modification in this case is to suspend the power to the non-active zone. Driver 310 glances at the navigation display to check the route taken, and after the controller 306 determines that the gaze of driver 310 is genuine, the controller 306 determines and processes the active and non-active zone signal, and transmits a telegram to the controller (not shown) of displays 308. When the telegram is received by the controller of displays 308, the controller of displays 308 identifies that the navigation display belongs to the active zone, and the head up display and displays 3 to p belong to the non-active zone. The controller of displays 308 then proceeds to suspend the power to the non-active zone, while maintaining the navigation display as a colour display with full brightness and contrast as well as maintaining movement of the navigation map as the vehicle advances to the destination. Thus, the navigation display is operated at an enhanced level as compared to the head up display and displays 3 to p.

Driver 310 is now driving with his eyes on the road ahead and is following navigation instructions from the navigation display which are output via the audio output. Driver 310 is confused by an instruction and tilts his head to the side while looking again at the navigation display. The head tilt and confused facial expression are received or detected by interior camera 302 and head movement sensor 303 and processed by controller 306 as a facial gesture command to activate an increase in volume with a repeat of the audio navigation instruction. Thus, operation of the active navigation display comprises modifying the audio output of the navigation display by increasing the volume of the audio output and repeating the audio output. Further, operation of the audio output of the active zone is activated upon the facial gesture command from the driver.

Interior camera 302 and head movement sensor 303 detects that driver 310 not only glances at the navigation display but also his calendar events displayed on display 3 which displays synced items from his connected mobile device. The controller 306 keeps count of the number of gazes on each content (including the calendar events) and the duration of each gaze on each content to tabulate the attention score of each content. Say the highest ranked content at the end of two minutes is the calendar events and the head up display was previously selected by driver 310 to display the highest ranked content. The controller 306 then directs the audio output to sound out the question "copy calendar events to head up display?" When microphone 305 detects the reply of "yes" from driver 310, the controller 306 processes the reply as a voice command to activate copying and displaying of the calendar events on the head up display. Thus, display of the highest ranked content on a selected display is activated upon the voice command from the driver 310.

The invention claimed is:

1. A display system in a vehicle, the system comprising:
one or more displays;
at least one sensor configured to determine a user's line of sight;
an input means to receive a command from the user; and
a controller configured to determine an active zone and a non-active zone of the one or more displays based on the user's line of sight,
wherein the one or more displays are configured to operate the active zone at an enhanced level as compared to the non-active zone, and
wherein the controller is configured (i) to determine that a user's gaze is directed toward the active zone of the one or more displays, (ii) to use data obtained from the input means to determine a user feedback occurring at a same time as the user's gaze, the user feedback comprising a head movement or a body movement by the user responding to the operation of the active zone at the enhanced level, and (iii) to associate the user feedback with a particular modification to the operation of the active zone at the enhanced level, and (iv) to perform the particular modification of the active zone at the enhanced level upon detection of the user feedback.

2. The system of claim 1, wherein operation of the active and non-active zones comprises modification of an operating parameter of the one or more displays selected from the group consisting of: illumination; movement of any object on the display; magnification; and combinations thereof.

3. The system of claim 2, wherein illumination of the non-active zone is modified to have at least one of: lower brightness, lower contrast, or lower grey-scale value, as compared to the active zone.

4. The system of claim 2, wherein the movement of any object on the display is suspended in the non-active zone.

5. The system of claim 1, wherein:
the system comprises one display, the active zone and non-active zone are within the one display; or
the system comprises more than one display, the active zone comprising one or more displays.

6. The system of claim 5, wherein, where the active zone is within one display, the active zone is magnified.

7. The system of claim 1, wherein the one or more displays are connected to an audio output, and wherein where an object displayed in the active zone is accompanied by audio, operation of the active zone comprises at least one of: an increased volume of the audio output, or a repeat of the audio output.

8. The system of claim 1, wherein the input means comprises: a movement sensor to sense the movement by the user.

9. The system of claim 7, wherein operation of the audio output of the active zone is activated upon the command from the user.

10. The system of claim 1, wherein the one or more displays is selected from the group consisting of: an instrument cluster, a head up display, a secondary display, a digital rear view mirror or one or more digital side view mirrors.

11. The system of claim 1, wherein the at least one sensor is selected from the group consisting of: interior camera, head movement sensor, and body movement sensor.

12. A method of operating one or more displays in a vehicle using the system claim 1, the method comprising:
determining, by at least one sensor, a user's line of sight;
determining, by a controller, an active zone and a non-active zone of the one or more displays based on the user's line of sight;
operating the active zone of the one or more displays at an enhanced level as compared to the non-active zone;
determining that a user's gaze is directed toward the active zone of the one or more displays;
using data obtained from input means to determine a user feedback occurring at a same time as the user's gaze, the user feedback comprising a head movement or a body movement made by the user responding to the operation of the active zone at the enhanced level;
associating the user feedback with a particular modification to the operation of the active zone at the enhanced level; and
performing the particular modification of the active zone at the enhanced level upon detection of the user feedback.

13. The method of claim 12, wherein operating the active and non-active zones comprises modifying an operating parameter of the one or more displays selected from the group consisting of: illumination; movement of any object on the display; magnification;
and combinations thereof.

14. The method of claim 12, wherein operating the active and non-active zones comprises at least one of:
decreasing brightness of the non-active zone as compared to the active zone;
decreasing contrast of the non-active zone as compared to the active zone;
decreasing a grey-scale value of the non-active zone as compared to the active zone; or suspending movement of any object on the display of the non-active zone.

15. The method of claim 12, wherein, where the active zone is within one display, operating the active zone comprises magnifying the active zone.

16. The method of claim 12, wherein, where an object displayed in the active zone is accompanied by audio, operating the active zone comprises at least one of:
increasing the volume of the audio output; or
repeating the audio output.

17. The method of claim 12, wherein the input means comprises; a movement sensor to send the movement by the user; or combinations thereof.

18. The method of claim 16, wherein when the command from the user is received, the steps of increasing the volume of the audio output of the active zone and/or repeating the audio output of the active zone are activated.

19. The method of claim 12, wherein the one or more displays is selected from the group consisting of: an instrument cluster, a head up display, a secondary display, a digital rear view mirror and one or more digital side view mirrors.

20. The method of claim 12, wherein the at least one sensor is selected from the group consisting of: interior camera, head movement sensor, and body movement sensor.

21. The system of claim 1, wherein the controller is configured to create a new association between the user feedback and the particular modification to the operation of the active zone at the enhanced level.

22. A controller configured to rank content displayed on one or more displays in a vehicle according to an attention score determined by at least one sensor configured to measure gaze of a user based on the user's line of sight, wherein the controller is configured (i) to determine that a user's gaze is directed toward the active zone of the one or more displays, (ii) to use data obtained from input means configured to receive a command from the user, and to determine a user feedback occurring at a same time as the user's gaze, the user feedback comprising a head movement or a body movement made by the user responding to operation of an active zone of the one or more displays at an enhanced level, and (iii) to associate the user feedback with a particular modification to the operation of the active zone at the enhanced level, and (iv) to perform the particular modification of the active zone at the enhanced level upon detection of the user feedback.

23. The controller of claim 22, wherein the attention score is determined by at least one of: number of gazes on a content or duration of each gaze on the content.

24. The controller of claim 22, wherein content is selected from the group consisting of: driving mode, calendar event, route destination, traffic information, weather, time, and a combination thereof.

25. A display system in a vehicle, the system comprising:
one or more displays;
at least one sensor configured to determine a user's line of sight;
the controller of claim 22,
wherein one of the displays is selected to display the highest ranked content.

26. The system of claim 25, wherein the controller is configured to rank content displayed on one or more displays in a vehicle according to an attention score determined by at least one sensor configured to measure gaze of a user based on the user's line of sight, wherein one of the displays in the active zone is selected to display the highest ranked content.

27. A method of operating one or more displays in a vehicle using the system of claim 25, the method comprising:
determining, by the at least one sensor, a user's line of sight;
determining, by the controller, a ranking of content displayed on each display according to an attention score determined by gaze of the user based on the user's line of sight;
selecting one of the displays to display the highest ranked content;
displaying the highest ranked content on the selected display;
operating an active zone of the one or more displays at an enhanced level as compared to a non-active zone;
determining that a user's gaze is directed toward the active zone of the one or more displays;
using data obtained from input means to determine a user feedback occurring at a same time as the user's gaze, the user feedback comprising a head movement or a body movement made by the user responding to the operation of the active zone at the enhanced level;
associating the user feedback with a particular modification to the operation of the active zone at the enhanced level; and
performing the particular modification of the active zone at the enhanced level upon detection of the user feedback.

28. The method of claim 27, further comprising using data obtained from the at least one sensor and/or the input means in an artificial intelligence software to compare display output with user intent.

* * * * *